United States Patent
Gutkin et al.

(10) Patent No.: US 8,305,971 B2
(45) Date of Patent: Nov. 6, 2012

(54) UTILIZING PERSISTENT INTERFERENCE INFORMATION FOR RADIO CHANNEL SELECTION

(75) Inventors: Igal Gutkin, Redwood City, CA (US); Saurabh Bhasin, San Jose, CA (US); Neil Robert Diener, Hudson, OH (US); Sandeep Jay Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 675 days.

(21) Appl. No.: 12/352,684

(22) Filed: Jan. 13, 2009

(65) Prior Publication Data

US 2010/0177710 A1 Jul. 15, 2010

(51) Int. Cl.
 *H04W 74/00* (2009.01)
 *H04B 1/00* (2006.01)

(52) U.S. Cl. ....... 370/329; 370/436; 455/63.1; 455/450; 455/509

(58) Field of Classification Search .......... 370/209, 370/302, 320, 322, 329, 330, 331, 332, 335, 370/341, 342, 347, 348, 431, 443, 462, 436; 455/63, 423, 450, 452, 453, 509, 513, 524–525, 455/560, 63.1
See application file for complete search history.

(56) References Cited

U.S. PATENT DOCUMENTS

| | | | |
|---|---|---|---|
| 5,077,753 A | 12/1991 | Grau, Jr. et al. | |
| 5,210,771 A | 5/1993 | Schaeffer et al. | |
| 5,220,564 A | 6/1993 | Tuch et al. | |
| 5,412,687 A | 5/1995 | Sutton et al. | |
| 5,452,319 A | 9/1995 | Cook et al. | |
| 5,541,954 A | 7/1996 | Emi | |
| D375,297 S | 11/1996 | Casarez et al. | |
| 5,621,767 A | 4/1997 | Brandt et al. | |
| 5,668,828 A | 9/1997 | Sanderford, Jr. et al. | |
| 5,697,059 A | 12/1997 | Carney | |
| 5,710,795 A | 1/1998 | Tsumura | |
| 5,774,808 A | 6/1998 | Sarkioja et al. | |
| 5,809,059 A | 9/1998 | Souissi et al. | |
| 5,844,936 A | 12/1998 | Lesthievent | |

(Continued)

FOREIGN PATENT DOCUMENTS

WO WO 02/082844 10/2002

(Continued)

OTHER PUBLICATIONS

Extended European Search Report dated Nov. 17, 2011 for European Patent Application No. 10150677.2.

(Continued)

*Primary Examiner* — Habte Mered
(74) *Attorney, Agent, or Firm* — Tucker Ellis LLP

(57) ABSTRACT

In an example embodiment, an apparatus selects radio channels based on persistent interference device information. The apparatus comprises a wireless transceiver operable to communicate over a plurality of channels and channel selection logic in communication with the wireless transceiver and operable to select a channel for the wireless transceiver. The channel selection logic is operable to acquire data representative of intensity, duration and rate of occurrence for at least one persistent interference device detected by the wireless transceiver operating on at least one of the plurality of channels. The channel selection logic is operable to select a channel for the wireless transceiver based on the data representative of intensity, duration and rate of occurrence for the at least one persistent interference device.

19 Claims, 3 Drawing Sheets

U.S. PATENT DOCUMENTS

| | | | |
|---|---|---|---|
| 5,889,768 | A | 3/1999 | Storm et al. |
| 5,950,124 | A | 9/1999 | Trompower et al. |
| 5,995,844 | A | 11/1999 | Fukuda |
| 6,032,046 | A | 2/2000 | Nakano |
| 6,069,871 | A | 5/2000 | Sharma et al. |
| 6,178,329 | B1 | 1/2001 | Chao et al. |
| 6,195,554 | B1 | 2/2001 | H'mimy et al. |
| 6,208,629 | B1 | 3/2001 | Jaszewslo et al. |
| 6,208,836 | B1 | 3/2001 | Albuquerque Moraes |
| 6,418,317 | B1 | 7/2002 | Cuffaro et al. |
| 6,732,163 | B1 | 5/2004 | Halasz |
| 7,107,032 | B2 | 9/2006 | Li |
| 7,260,620 | B1 | 8/2007 | Halasz |
| 7,346,357 | B1 * | 3/2008 | Kim et al. ............. 455/453 |
| 7,555,300 | B2 * | 6/2009 | Scheinert et al. .......... 455/450 |
| 7,664,120 | B2 * | 2/2010 | Hershey ............. 370/400 |
| 2003/0107512 | A1 | 6/2003 | McFarland et al. |
| 2003/0206130 | A1 | 11/2003 | Husted et al. |
| 2004/0028003 | A1 * | 2/2004 | Diener et al. ............. 370/319 |
| 2004/0132411 | A1 | 7/2004 | Li |
| 2004/0137915 | A1 | 7/2004 | Diener et al. |
| 2004/0151137 | A1 | 8/2004 | McFarland et al. |
| 2004/0156336 | A1 | 8/2004 | McFarland et al. |
| 2004/0157580 | A1 | 8/2004 | Stadelmeier et al. |
| 2004/0171401 | A1 * | 9/2004 | Balachandran et al. ...... 455/522 |
| 2005/0059363 | A1 | 3/2005 | Hansen |
| 2005/0059364 | A1 | 3/2005 | Hansen et al. |
| 2007/0060065 | A1 | 3/2007 | Kruys |
| 2008/0227401 | A1 * | 9/2008 | Scherzer et al. ........... 455/67.13 |
| 2008/0233967 | A1 | 9/2008 | Montojo et al. |
| 2008/0292034 | A1 * | 11/2008 | Belogolovy et al. .......... 375/346 |
| 2010/0054146 | A1 * | 3/2010 | Rudland et al. ............... 370/252 |
| 2010/0142458 | A1 * | 6/2010 | Mark ............................ 370/329 |

FOREIGN PATENT DOCUMENTS

WO    WO 2006/077450    7/2006

OTHER PUBLICATIONS

U.S. Appl. No. 12/061,399, filed Apr. 2, 2008, Rangarajan.
U.S. Appl. No. 12/061,384, filed Apr. 2, 2008, Rangarajan et al.
Autocell Self-Organizing WLANs, Propagate Networks, 4 pages, 2004.
HotPoint 1000R Outdoor Wireless Mesh Router, firetide wireless instant networks, 2 pages; 2003-2004.
http://www.wi-fiplanet.com/news/article.php/2219011, Propagate's Embedded Software Calibrates WLANs, Jul. 21, 2004, pp. 1 and 2.
http://www.wi-fiplanet.com/news/article.php/3078631, FireTide Shows Off Mesh Router, Jul. 21, 2004, pp. 1 and 2.

\* cited by examiner

UTILIZING PERSISTENT INTERFERENCE INFORMATION FOR RADIO CHANNEL SELECTION

TECHNICAL FIELD

The present disclosure relates generally to channel selection for wireless devices.

BACKGROUND

The use of different wireless technologies in unlicensed radio bands is increasing. There are many devices like microwave ovens, cordless phones, Bluetooth devices etc. that operate in bands employed by wireless networks such as Wi-Fi. Some of these wireless technologies can disrupt communications for a wireless local area network (WLAN). Complicating the problem is that many interference devices can be intermittent in nature. For example, some interference devices may operate during specific times of the day while other devices may transmit periodically in burst mode.

One type of Dynamic Channel Selection Algorithm (DCSA) utilizes channel load information averaged over time. Due to averaging, such algorithms can underestimate and fail to account for burst transmission devices or periodically operating devices while performing channel planning.

Another type of DCSA uses reaction logic that dynamically moves nodes of a WLAN away from a channel when strong interference is detected. The nodes may be moved back to the channel after such interference disappears. Reaction algorithms can be problematic because of channels thrashing as devices appear and disappear on different channels. This can be disruptive to devices that are actively communicating on a WLAN because channel changes can be disruptive to voice calls, streaming data and/or file transfer activities or to any type of mission critical wireless devices such as medical devices, sensors, etc.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
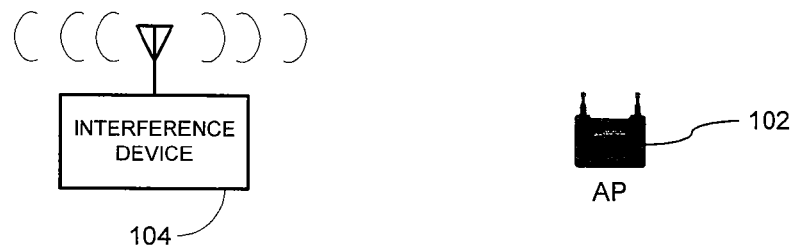
FIG. 1 illustrates an example of a wireless device that performs channel selection based on data gathered about a persistent interference device.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a wireless transceiver operable to communicate over a plurality of channels and channel selection logic in communication with the wireless transceiver and operable to select a channel for the wireless transceiver. The channel selection logic is operable to acquire data representative of intensity, duration and rate of occurrence for at least one persistent interference device detected by the wireless transceiver operating on at least one of the plurality of channels. The channel selection logic is further operable to select a channel for the wireless transceiver based on the data representative of intensity, duration and rate of occurrence for the at least one persistent interference device.

In accordance with an example embodiment, there is disclosed herein a method comprising acquiring data representative of intensity, duration and rate of occurrence for any persistent interference devices detected operating on at least one of a plurality of channels. A cost function is determined for all of the plurality of channels based on the intensity, duration and rate of occurrence of detected persistent interference devices A channel is selected based on the cost function.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a heuristic method for Wireless Local Area Network (WLAN) dynamic channel selection. An algorithm described herein detects and identifies persistent interference devices and pro-actively adjusting channel allocation based on this information.

Persistent interference devices can be defined as classified interference sources which are known to be:

1) static in space (e.g., they impact the same APs over time); and 2) static in operating frequency e.g., they impact the same channels over time).

Examples would include devices like microwave ovens, wireless video cameras, and wireless bridges. Because of the persistent nature of these devices, they should be taken in account by a Dynamic Channel Selection Algorithm (DCSA) even when they are not actively transmitting at the time the DCSA is calculating the channel plan. Essentially, there is a reasonable expectation that these device will transmit at a certain place and a certain channel in a short time in the future.

Persistent devices are identified by detecting and classifying interference devices when they are present in the RF environment, and by correlating over time multiple detections of the same device. Thus, in an example embodiment persistent device detection comprises an ability to identify specific interference device types, and protocol specific characteristics allowing the system to correlate or distinguish between multiple detections of the same or similar devices over time. Persistent device detection may further include a system for historically tracking devices over time, and aging out older devices if they no longer detected. The system should record when the device starts operating, when it stops operating, what power level was observed at what APs, and what channels were impacted. A persistent device detector may also include an ability to penalize against channels affected by these devices during channel assignment, where the penalty is proportionate to the amount of interference these devices cause, and how often they tend to cause it.

An aspect of the example embodiments described herein improve the effectiveness of dynamic channel selection algorithms, by improving initial channel selection quality and/or reducing the number of WLAN network interruption caused by channel changes in response to persistent non-Wi-Fi co-channel interference. This can improve embodiments employing dynamic channel selection algorithms that either fail to take in account interference sources which are not active at the time when algorithm creates the channel plan, or cause network disruption by changing channel in response to strong interference which appears periodically.

In an example embodiment, an Interference device report (IDR) provides information about specific characteristics of one or multiple interference devices detected by the Spectrum-capable AP. A Spectrum-capable AP reports IDR on the serving Wi-Fi channel. It is also a desired feature for APs that do rogue scanning to report off-channel IDR when possible. APs operating in monitor mode report IDR on all channels. The IDR report includes device identification information and RF data allowing characterization of the impacts of a particular interferer to the Wi-Fi environment, and tracking of the device by a Mobility Service Engine (MSE).

The following represents an example of an IDR report:

| Parameter name | Notes |
| --- | --- |
| Device Signature (PMAC) | this parameter shows either device unique MAC address or a generated pseudo MAC value consisting of radio parameters specific to the device type |
| Event type | device up, down, update and etc. |
| Device Type | contains information about device type and device category |
| Timestamp | |
| Detected Channels | supporting detection on multiple channels within the same radio band |
| Radio Band ID | 2.4 GHz/5 GHz/other |
| Interference Severity Index | |
| Interference Duty Cycle | |
| Antenna ID | support for multiple antenna reports |
| Tx Power (RSSI) per antenna | |

In an example embodiment after gathering data for persistent interference devices for each channel, a cost function for each interfering source is computed for each channel the interfering source is detected. Persistent interferers may be broken down into categories, Narrow and Wide band. Narrow band interferers are interferers that typically effect a single channel. An analog video device would be an example of a narrow interference device. The cost function for Narrow interference is applied to the channel that is impacted.

A wide band interferer (interference device) is a device that may affect a plurality of channels simultaneously. A microwave oven is an example of a wide interference device. A wide interference device may impact each channel differently; therefore, a separate cost function for a wide interference device is computed for each channel.

For both types of interferers, wide and narrow band, a history per channel of the duty cycle is maintained. In an example embodiment, the duty cycle history is updated if the interference generated by the device is above the receiver sensitivity of the radio detecting the interference device. An aging function may also be employed to remove persistent interference devices that have not been detected for a predetermined period of time, for example a week. This ensures interference devices that are no longer operating will no longer affect the cost function for the channel.

Data employed in computing a cost function for an interfering source may include channel, intensity, duration, rate of recurrence and/or times of day the device is detected (for example lunch time for microwave ovens). Thus the cost function (or penalty) for a channel may be a function of time of day (e.g. if devices operate at certain times of day the channel cost function during those times may be different than at other times of day), intensity (higher intensity interferers would have higher costs/penalties than lower intensity interferers), duration (the longer the duration, the higher the cost function), and rate of occurrence (an interfering device that is more active will produce a higher cost function than a less active interfering device).

In an example embodiment, the cost function further includes additional factors, such as one or more of network contention/collision, foreign radio contention/collision, and/or noise floor. For example, a cost function (CF) can be computed as $$CF(R\_i, \text{freq}) = W\_network * C\_network(R\_i, \text{freq}) + \\ W\_foreign * C\_foreign(R\_i, \text{freq}) + \\ W\_noise * C\_noise(R\_i, \text{freq}) + \\ W\_persistent * C\_persistent(R\_i\_\text{freq}), \text{ where}$$

R_i is radio I freq=channel

C_network=cost of contention/collision of neighbor radios which are controllable within the system C_foreign=cost of contention/collision of rogue/foreign radios that are not controllable in the system C_noise=cost of noise floor (throughput cost because of noise floor)

C_persistent=cost of persistent interference devices

W_network=weighting factor for network contention/collision cost

W_foreign=weighting factor for foreign radio contention/collision cost

W_noise=weighting factor for noise floor.

W_persistent=weighting factor for persistence interference devices.

Note that there may be some overlap between C_noise and C_persistent, but the former is an averaged value from the viewpoint of the PHY (Physical Layer Processor), and the latter is a special additional cost associated with devices that are recognized to persist in both time and space—thus being a problem even if they were not active during the last measurement interval.

In an example embodiment, the aforementioned cost function is employed by Dynamic Channel Allocation (DCA) logic to perform a search that minimizes the cumulative cost function of the entire system. For example, a cost function is computed for each channel supported by each radio and radio channels are assigned to minimize the sum of the cost of every radio in the system. Moreover, because certain persistent interference devices tend to be periodic (for example microwave ovens would be most likely to cause interference during lunch times), cost functions can be computed for various times of day that would allow radios to switch channels during certain time periods before anticipated interference from persistent interference devices is encountered.

Referring now to FIG. 1, there is illustrated an example of a wireless device (an access point or "AP" in this example) 102 that performs channel selection based on data gathered about a persistent interference device 104. AP 102 comprises a wireless transceiver (not shown, see for example wireless transceiver 302 in FIG. 3) and logic (not shown, see for example channel selection logic 306 in FIG. 3) for selecting a channel for the wireless transceiver based on detecting the channel, intensity, duration and rate of occurrence detected for interference device 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

The data representative of intensity, duration and rate of occurrence for at least one persistent interference device may be updated due to predefined events. For example, channel selection logic in AP 102 may periodically determine whether persistent interference device 104 is still in operation and select a new channel accordingly. As another example, channel selection logic may update upon detecting a signal from interference device 104 above a preset threshold, such as receiver sensitivity. As another example, channel selection logic may age out interference device 104 if a signal has not been received from interference device 104 for more than a predefined time period, for example a week.

In an example embodiment, channel selection logic in AP 102 is operable to determine a type of device for a detected persistent interference device. For example, channel selection logic can determine if the device is a device selected from a group consisting of a microwave ovens a wireless video camera, a wireless telephone and a wireless bridge.

In an example embodiment, channel selection logic in AP 102 is operable to determine a time of day and duration a persistent interference device 104 operates. The channel selection logic may be operable to select a new channel for the wireless transceiver prior to the time of day the persistent interference device 104 is scheduled to operate and remaining on the new channel for the duration.

In an example embodiment, channel selection logic in AP 102 is operable to have the wireless transceiver periodically scan the plurality of channels to update the data representative of intensity, duration and rate of occurrence for persistent interference device 104. For example, channel selection logic in AP 102 may scan each channel every 90 seconds.

In an example embodiment, persistent interference device 104 is a wide interferer as described herein supra that is detected on multiple channels. The channel selection logic in AP 102 is operable to compute a separate cost function based on the intensity, duration and rate of occurrence for each channel that persistent interference device 104 is detected on, based on the data acquired for persistent interference device 104 on each channel.

In example embodiments, channel selection logic in AP 102 also includes other factors in computing a cost function for each channel. For example, the channel selection logic may include data representative of a noise floor for each channel. As another example, the channel selection logic may also use data representative of network contention and network collisions. Moreover, the channel selection logic may also include data representative of network contention for detected foreign networks and data representative of collisions for detected foreign networks. The channel selection logic may use any combination of data representative of persistent interference device 104 characteristics, channel noise floor, network contention/collisions and foreign network contention/collision for computing a cost function for each channel employed by AP 102 and select a channel accordingly.

Figure 2:
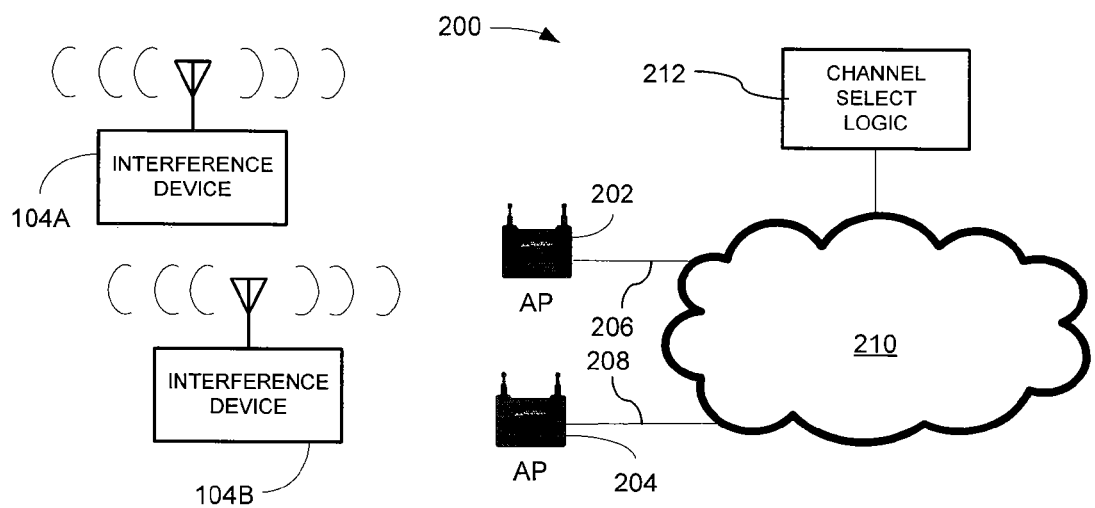
FIG. 2 illustrates an example of a system that employs channel select logic for selecting the channel for a plurality of wireless devices based on detected persistent interference devices.
Figure 2:
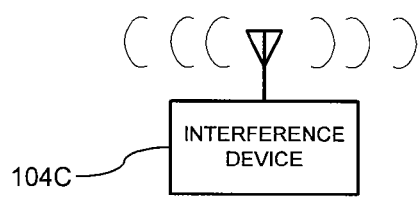

FIG. 2 illustrates an example of a system 200 that employs channel select logic 212 for selecting the operating channel for a plurality of wireless devices (access points in this example) 202, 204 based on detected persistent interference devices 104. Each of APs 202, 204 are capable of operating on at least one of a plurality of wireless channels. In this example, APs 202, 204 are coupled via communication links 206, 208 respectively to network 210 coupled to channel select logic 212. Although the illustrated example shows two APs 202, 204, this should not be construed as limiting the embodiments described herein two systems with two APs as those skilled in the art should readily appreciate that any physically realizable number of APs may be coupled to channel select logic 212. Links 206, 208 may suitably be a wired, wireless, or combination of wired and wireless communication links. Network 210 may suitably comprise a wired, wireless and/or combination of wired and wireless links.

In an example embodiment, channel selection logic 212 acquires data representative of channel, intensity, duration, and rate (and/or time of day) of occurrences for interfering devices 104 as detected by each AP 202, 204. For example, AP 202 may only detect interference devices 104A, 104B while AP 204 may only detect interferences devices 1 104B, 104C. Therefore, channel selection logic 212 would acquire data representative intensity, duration and rate for each channel that interference device 104A is detected by AP 202. Similarly, channel selection logic 212 would acquire data representative intensity, duration and rate for each channel that interference device 104B is detected by AP 202. Channel selection logic 212 would also acquire data representative intensity, duration and rate for each channel that interference device 104B is detected by AP 204. Channel selection logic 212 also acquires data representative intensity, duration and rate for each channel that interference device 104C is detected by AP 204. Channel selection logic 212 computes a cost function for each channel employed by AP 202 and each channel employed by AP 204. Channel selection logic 212 selects a channel for AP 202 and AP 204 based on the computed cost functions. In particular embodiments, channel selection logic 212 selects channels for APs 202, 204 that minimizes the sum of the cost functions for selected channels (e.g. minimizes the cumulative cost function). For example min(cost function of selected channel AP 202+cost function of selected channel AP 204).

The data representative of intensity, duration and rate of occurrence for at least one persistent interference device may be updated due to predefined events. For example, channel selection logic in AP 102 may periodically determine whether persistent interference device 104 is still in operation and select a new channel accordingly. As another example, channel selection logic may update upon detecting a signal from interference device 104 above a preset threshold, such as receiver sensitivity. As another example, channel selection logic may age out interference device 104 if a signal has not been received from interference device 104 for more than a predefined time period, for example a week.

In an example embodiment, channel selection logic 212 is operable to determine a type of device for a detected persistent interference device. For example, channel selection logic 212 can determine if the device is a device selected from a group consisting of a microwave ovens a wireless video camera, a wireless telephone and a wireless bridge.

In an example embodiment, channel selection logic 212 is operable to determine a time of day and duration a persistent interference device 104 operates. Channel selection logic 212 may be operable to select a new channel for a wireless transceiver of AP 202 and/or 204 prior to the time of day the persistent interference device 104 is scheduled to operate and remaining on the new channel for the duration.

In an example embodiment, channel selection logic 212 is operable to have the wireless transceivers of AP 202 and/or 204 periodically scan their available channels to update the data representative of intensity, duration and rate of occurrence for persistent interference devices 104A, 104B, 104C. For example, channel selection logic 212 may scan each channel every 90 seconds.

In an example embodiment, one or more of persistent interference devices 104 is a wide interferer as described herein supra that is detected on multiple channels. Channel selection logic 212 is operable to compute a separate cost function based on the intensity, duration and rate of occurrence for each channel that a persistent interference device 104 is detected on, based on the data acquired for a persistent interference device 104 on each channel.

In example embodiments, channel selection logic 212 also includes other factors in computing a cost function for each channel for each AP 202, 204. For example, channel selection logic 212 may include data representative of a noise floor for each channel. As another example, the channel selection logic 212 may also use data representative of network contention and network collisions. Moreover, the channel selection logic 212 may also include data representative of network contention for detected foreign networks and data representative of collisions for detected foreign networks. Channel selection logic 212 may use any combination of data representative of a persistent interference device 104 characteristics, channel noise floor, network contention/collisions and foreign network contention/collision for computing a cost function for each channel employed by APs 202, 204 and select a channel for each AP 202, 204 accordingly.

Figure 3:
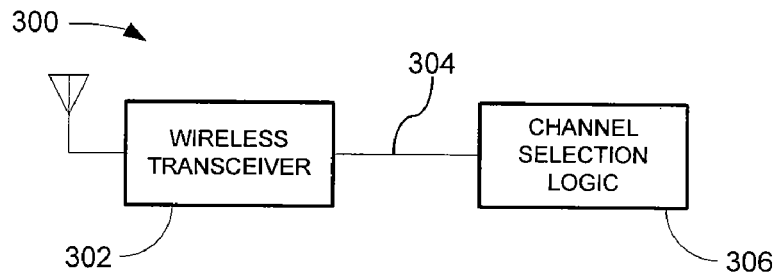
FIG. 3 illustrates an example of an apparatus suitable for implementing an example embodiment described herein.

FIG. 3 illustrates an example of an apparatus 300 suitable for implementing an example embodiment described herein. For example, apparatus 300 is suitable for implementing AP 102 (FIG. 1). Apparatus 300 comprises a wireless transceiver 302 coupled via link 304 to channel selection logic 306. For the purposes of this example, a single wireless transceiver 302 is illustrated; however those skilled in the art should readily appreciate that any physically realizable number of wireless transceivers can be coupled to channel selection logic that may employ link 304 or separate links (not shown). Link 304 may suitably comprise a wired, wireless, or combination of wired and wireless communication links.

Figure 4:
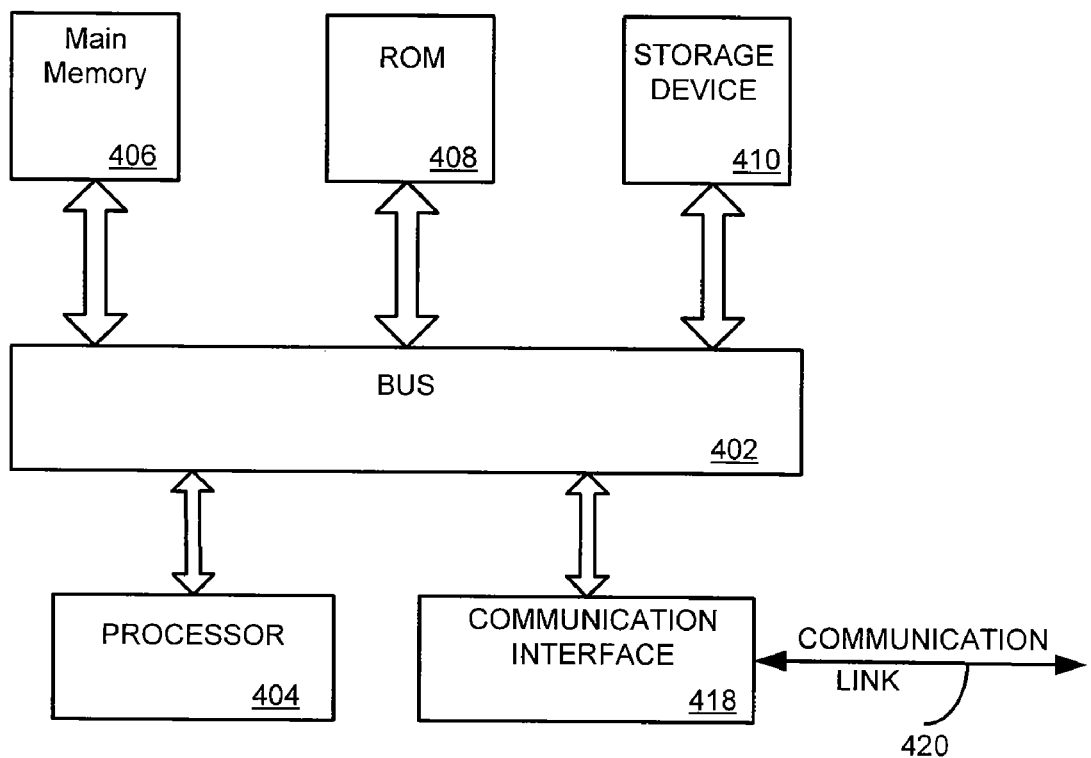
FIG. 4 illustrates an example of a computer system upon which an example embodiment may be implemented.

FIG. 4 illustrates an example of a computer system 400 upon which an example embodiment may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the example embodiment is related to the use of computer system 400 for utilizing persistent channel information for radio channel selection. According to an example embodiment, utilizing persistent interference information for radio channel selection s provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media and volatile media. Non-volatile media include for example optical or magnetic disks, such as storage device 410. Volatile media include dynamic memory such as main memory 406. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. A remote computer can load the instructions into its dynamic memory and send the instructions using a modem. A modem local to computer system 400 can receive the. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling computer system 400 to a communication link 420. For example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Figure 5:
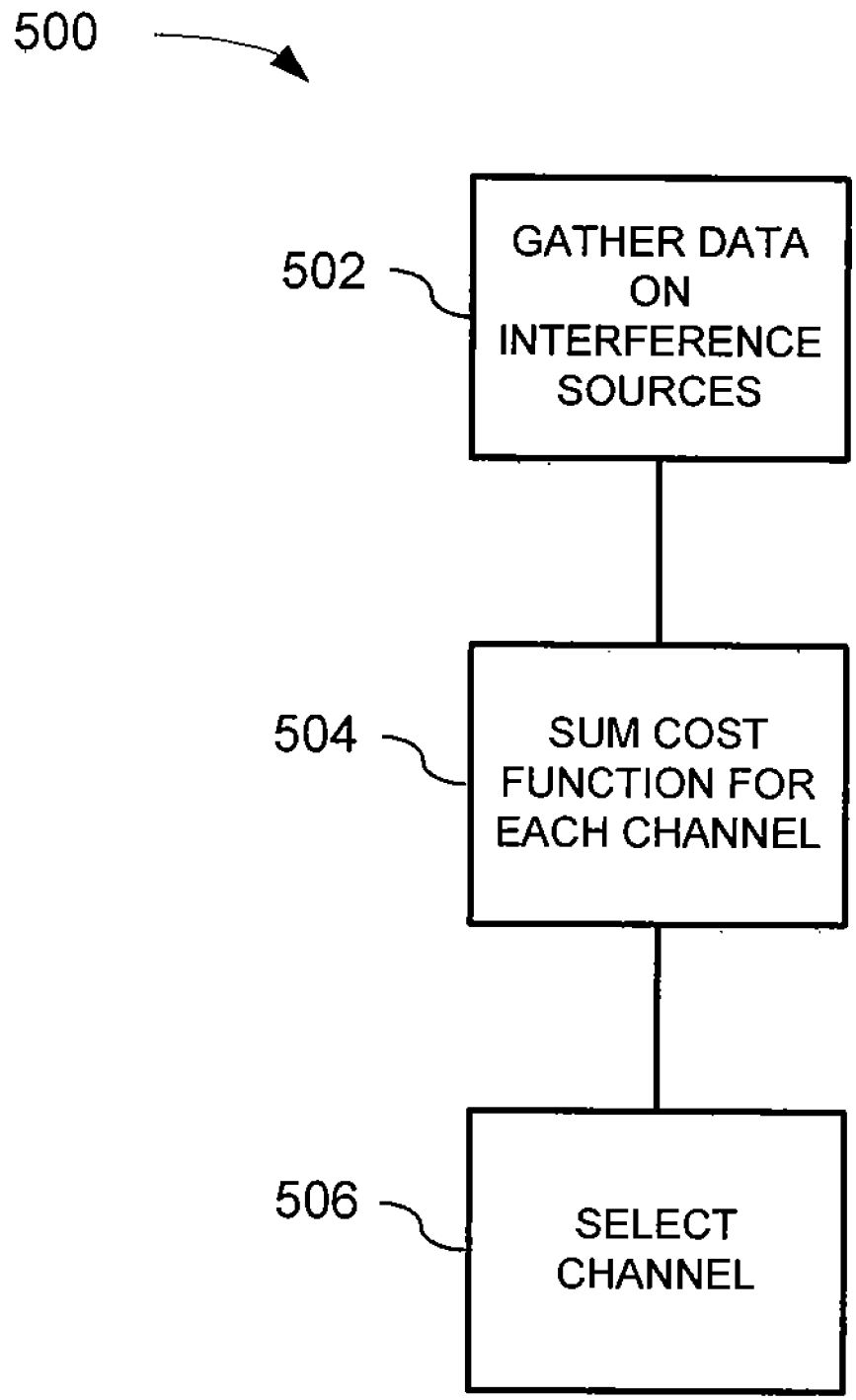
FIG. 5 illustrates an example of a methodology in accordance with an example embodiment.

In view of the foregoing structural and functional features described above, a methodology 500 in accordance with an example embodiment will be better appreciated with reference to FIG. 5. While, for purposes of simplicity of explanation, methodology 500 of FIG. 5 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement methodology 500 in accordance with an aspect the example embodiment. Methodology 500 described herein is suitably adapted to be implemented in hardware, software, or a combination thereof.

At 502, data is gathered on detected persistent interference sources. The data acquired may include data representative of intensity, duration and rate of occurrence for any persistent interference devices detected operating on at least one of a plurality of channels. For example, wide persistent interference device, such as a microwave oven may be detected over several channels, and have different levels of intensity, duration and rate of occurrence on each channel, and a narrow persistent interference device, such as an analog video monitor, may be detected on a single channel.

In an example embodiment, other data may be gathered for each channel. For example, the noise floor for each channel may be determined. In addition, contention/collision data may be acquired for the wireless local area network (WLAN) as well as for any detected foreign networks. In an example embodiment, an interference device report (IDR) as described herein may be generated.

The data representative of intensity, duration and rate of occurrence a persistent interference device may be updated due to predefined events. For example, channels may be periodically scanned to determine whether a persistent interference device is still operating. As another example, data for a persistent interference device may be updated upon detecting a signal from the persistent interference device above a preset threshold, such as receiver sensitivity. As another example, an interference device may be aged out if a signal has not been received from the interference device for more than a predefined time period, for example a week.

At 504, a cost function is determined for each channel. The cost function can be based on the intensity, duration and rate of occurrence of detected persistent interference devices. In an example embodiment, the cost function further includes additional factors, such as one or more of network contention/collision, foreign radio contention/collision, and/or noise floor. For example, as described herein supra, a cost function (CF) can be computed as:

$$CF(R\_i, freq) = W\_network * C\_network(R\_i, freq) + W\_foreign * C\_foreign(R\_i, freq) + W\_noise * C\_noise(R\_i, freq) + W\_persistent * C\_persistent(R\_i\_freq), \text{ where}$$

R_i is radio I freq=channel

C_network=cost of contention/collision of neighbor radios which are controllable within the system C_foreign=cost of contention/collision of rogue/foreign radios that are not controllable in the system C_noise=cost of noise floor (throughput cost because of noise floor)

C_persistent=cost of persistent interference devices

W_network=weighting factor for network contention/collision cost

W_foreign=weighting factor for foreign radio contention/collision cost

W_noise=weighting factor for noise floor.

W_persistent=weighting factor for persistence interference devices.

The cost function is computed for each channel each device operates. For example if an access point can operate on ten channels, a cost function is computed for each channel. If there are multiple access points, a cost function is calculated for each channel for reach access point.

At 506, a channel is selected for each wireless device based on the computed cost function. In an example embodiment, the channels are selected in manner that minimizes the cumulative sum of the cost functions computed for each device. For example if two wireless devices are being assigned channels, the channels may be selected base on min(cost function of selected channel of first wireless device+cost function of selected channel of second wireless device).

In an example embodiment, methodology 500 also determines a time of day and duration a persistent interference device operates. For example, historical data may indicate that a microwave device is frequently operated between 12 noon and 1pm, therefore, a second cost function can be computed for the time period starting at 12 noon for one hour. A new channel can be selected for a wireless device prior to the time of day the persistent interference device is scheduled to operate based on the second cost function. The wireless device can remain on the new channel for the duration. This enables a wireless device to proactively change channels before a persistent interference device disrupts communications.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a wireless transceiver operable to communicate over a plurality of channels, the wireless transceiver comprising a receiver having a receiver sensitivity setting;
channel selection logic in communication with the wireless transceiver and operable to select a channel for the wireless transceiver;
wherein the channel selection logic is operable to acquire data representative of intensity, start time, stop time, and rate of occurrence for at least one persistent interference device detected by the receiver of the wireless transceiver operating on at least one of the plurality of channels;
wherein the channel selection logic is operable to determine a duration that the at least one persistent interference device operates from the start time and stop time;
wherein the channel selection logic is operable to select a channel for the wireless transceiver based on the data representative of intensity, duration and rate of occurrence for the at least one persistent interference device; and,
wherein the channel selection logic is operable to selectively update the data representative of intensity, duration and rate of occurrence for the at least one persistent interference device responsive to a detected signal level from the at least one persistent interference device being above a selected threshold of the receiver sensitivity setting of the receiver.

2. The apparatus of claim 1, further comprising a multiplicity of wireless transceivers operable to communicate over a plurality of channels;
wherein the channel selection logic computes a cost function based on data representative of intensity, duration and rate of occurrence for the at least one persistent interference device for each channel and transceiver detecting at least one persistent interference device; and wherein the channel selection logic is operable to select a channel for each of the multiplicity of wireless transceivers based on a cumulative cost function from the data representative of intensity, duration and rate of occurrence for the at least one persistent interference device for each channel and transceiver detecting at least one persistent interference device.

3. The apparatus of claim 2, wherein the channel selection logic selects the channel for each of the multiplicity of wireless transceivers that minimizes the cumulative cost function.

4. The apparatus of claim 1, wherein the channel selection logic is operable to discard the data representative of intensity, duration and rate of occurrence for a persistent interference device responsive to failing to detect a signal from the device for at least a predefined time period.

5. The apparatus of claim 1, wherein the channel selection logic is operable to determine a type of device for a detected persistent interference device.

6. The apparatus of claim 5, wherein the type of device is selected from a group consisting of a microwave ovens, a wireless video camera, and a wireless telephone.

7. The apparatus of claim 1, wherein the channel selection logic is operable to determine a time of day and duration a persistent interference device operates.

8. The apparatus of claim 7, wherein the channel selection logic is operable to select a new channel for the wireless transceiver prior to the time of day the persistent interference device is scheduled to operate and remaining on the new channel for the duration.

9. The apparatus of claim 1, wherein the channel selection logic is operable to have the wireless transceiver periodically scan the plurality of channels to update the data representative of intensity, duration and rate of occurrence for at least one persistent interference device detected by the wireless transceiver operating on at least one of the plurality of channels.

10. The apparatus of claim 1, wherein a wide persistent interference device is detected on a group of channels selected from the plurality of channels; and wherein the channel selection logic is operable to compute a separate cost function based on the intensity, duration and rate of occurrence for each channel in the group of channels.

11. The apparatus of claim 1, wherein the channel selection logic is further operable to obtain data representative of a noise floor from the wireless transceiver; and wherein the channel selection logic is further operable to select a channel for the wireless transceiver based on the data representative of the noise floor.

12. The apparatus of claim 11, wherein the channel selection logic is further operable to obtain data representative of network contention and network collisions from the wireless transceiver; and wherein the channel selection logic is further operable to select a channel for the wireless transceiver based on the data representative of the network contention and network collisions.

13. The apparatus of claim 12, wherein the channel selection logic is further operable to obtain data representative of a foreign network contention and foreign network collisions from the wireless transceiver; and wherein the channel selection logic is further operable to select a channel for the wireless transceiver based on the data representative of the foreign network contention and foreign network collisions.

14. A method executed in an associated apparatus including a wireless transceiver operable to communicate over a plurality of channels and channel selection logic in communication with the wireless transceiver, the method comprising:

acquiring data representative of intensity, a start time, a stop time, and rate of occurrence for any persistent interference devices detected operating on at least one of a plurality of channels;

determining a duration for a detected persistent interference device from the start time and stop time;

determining a cost function for all of the plurality of channels based on the intensity, duration and rate of occurrence of detected persistent interference devices;

selecting a channel based on the cost function; and, selectively updating the data representative of intensity, a start time, a stop time, and rate of occurrence in accordance with a level of interference of the detected persistent interference devices relative to a predetermined sensitivity threshold setting of a receiver of the associated wireless transceiver.

15. The method set forth in claim 14, wherein the acquiring data is performed for a multiplicity of wireless devices operating on a plurality of channels; and wherein channels are selected for each of the multiplicity of wireless devices, the channels are selected based on the cost function computed for each channel for each of the multiplicity of wireless devices.

16. The method set forth in claim 15, wherein the channels are selected in manner that minimizes the cumulative sum of the cost functions computed for each device.

17. The method set forth in claim 14, further comprising determining a time of day and duration a persistent interference device operates.

18. The method set forth in claim 17, further comprising selecting a new channel for a wireless device prior to the time of day the persistent interference device is scheduled to operate and remaining on the new channel for the duration.

19. The method set forth in claim 17, further comprising correlating over time multiple detections of a same persistent interference device.

* * * * *